2,890,100

PURIFICATION OF CRUDE TITANIUM TETRACHLORIDE

Delmar B. Davis and Alexandre R. Tarsey, Henderson, Nev., assignors to Titanium Metals Corporation of America, New York, N.Y., a corporation of Delaware No Drawing. Application January 31, 1957
Serial No. 637,355

5 Claims. (Cl. 23—87)

This invention relates to the purification of titanium tetrachloride, and more particularly, to a simple and economical process for purifying so-called "crude" titanium tetrachloride to produce a pure grade adapted for the manufacture of titanium metal, pigments and compounds.

Crude titanium tetrachloride is generally produced by chlorination of titaniferous iron ores or rutile. It is invariably contaminated by various impurities which are also chlorinated, or are carried over with the gaseous titanium tetrachloride from the chlorination furnace. The impurities include chlorides of minor metallic constituents in the ore, dust and foreign materials suspended in the titanium tetrachloride vapor stream, as well as other impurity materials picked up during processing. Many of these impurities may be separated by distillation processes. Some compounds, however, particularly those of vanadium, because of lack of appreciable differences in boiling points between these impurities and titanium tetrachloride, cannot be readily so separated.

A chemical treatment is therefore often employed to precipitate such impurities as insoluble compounds, in which form they may thereafter be more readily removed and the titanium tetrachloride thereby purified. Chemical treating agents heretofore proposed have included metallic copper, various salts and compounds, oils, carbonaceous organic compounds and reactive sulfides. Most of these treating agents are relatively expensive and involve the introduction of foreign materials into the titanium tetrachloride, and which must thereafter be separated, as well as impurities originally present in the crude titanium tetrachloride. In addition, previous methods proposed for treating and purification have not been well adapted for continuous or cyclic operation.

An object of this invention is to provide an improved method for the purification of titanium tetrachloride. A further object of this invention is to provide a more efficient and economical method for purification of titanium tetrachloride. These and other objects of this invention will become apparent from the following complete description thereof.

In its broadest aspects, this invention contemplates, first contacting purified titanium tetrachloride with a carbonaceous reducing agent at an elevated temperature to produce vaporous titanium trichloride, condensing the so produced vaporous titanium trichloride with cold crude titanium tetrachloride, thereby to form a mixture of titanium trichloride and crude titanium tetrachloride, distilling the mixture to produce purified titanium tetrachloride, and employing a portion of the purified titanium tetrachloride recycled back to react with the carbon to produce titanium trichloride.

The reducing agent may be carbon, coal, coke, graphite, or other suitable and essentially carbonaceous material. Coke is preferably employed, since it may be obtained in relatively pure form, at reasonable cost and may be crushed to a degree of subdivision suitable for reaction with titanium tetrachloride. The size of the particles may vary considerably depending on the type and size of apparatus employed and the flow rate of titanium tetrachloride vapor with which they react. Preferably carbon lumps, ranging in size from ¼ to ½ inch in diameter, are employed for small-scale operations. Larger sizes may be more useful for operation of the process of this invention on a large scale. The apparatus employed for contacting the carbon and the purified titanium tetrachloride may be of convenient and conventional design, and this may vary considerably depending largely on the size of the carbon particles and the gas flows involved. The reactor, and/or the reactants contained therein, are heated by suitable means to maintain the carbon particles at a temperature above about 850° C. This may be accomplished, for example, by heating the reactor walls by electrical heating elements or placing the reactor in a gas fired furnace. In a preferred embodiment of this invention, however, the carbon reducing agent is employed as a packed mass in a reactor and heated to the desired temperature by passage of an electric current therethrough. Under these conditions, the carbon bed becomes its own heating means. Conversion and loss of the carbon by reaction with titanium tetrachloride may be compensated by continuous or intermittent additions of carbon particles or lumps to maintain the bed at a proper level and electrical operating conditions.

A packed bed of carbon lumps may be arranged in a suitable reactor and electric current passed therethrough by means of buried electrodes. The resistance of the bed rapidly and efficiently heats it to the desired temperature. The size of the carbon lumps, their packing and resistance characteristics and the reactor dimensions will be taken into account when applying known principles, familiar to those skilled in the art, to determine the amperage and voltage to be applied to obtain proper heating. Adjustments may be readily made by varying the current applied from a suitable external power source.

The temperature of the carbon reducing agent should be at least 850° C., and higher temperatures may be employed with corresponding accelerated reaction rate if desired. Temperatures of the order of 850° to 1500° C., may be conveniently utilized in commercial apparatus; limitations in connection with construction materials may affect the use of temperatures much above this range.

In the reduction step, the titanium tetrachloride feed rate, and temperature and size of the carbon particles are adjusted so that there is at all times an excess of titanium tetrachloride over that required to produce titanium trichloride under the particular operating conditions. The excess may range from 50% to several hundred percent if desired or required. The excess titanium tetrachloride tends to minimize the formation of titanium dichloride and also provides a sweep gas to carry titanium trichloride out of the reaction zone to its subsequent mixture with crude titanium tetrachloride.

The product gases from the reducing reactor will contain titanium trichloride and titanium tetrachloride as well as carbon tetrachloride, produced as a by-product from the reduction reaction, and inconsequential amounts of titanium dichloride, phosgene, dust, carbon particles mechanically dislodged from the bed, and other impurities. It is necessary to maintain the temperature of the product gases above about 400° C. during transfer to the condensing apparatus to avoid condensation of titanium trichloride before contact with cold crude titanium tertachloride. This may be accomplished by providing suitably insulated or heated reactor outlet and transfer pipe lines to prevent premature precipitation of solid titanium trichloride, which readily forms a difficultly removable coating on surfaces of equipment which it may contact.

Condensation of the hot vaporous titanium trichloride is accomplished by intimate contact with cold crude titanium tetrachloride. This may be carried out in suitable apparatus providing the essential gas to liquid contact, and is preferably conducted in a tower or chamber into which the gases are introduced so that they contact liquid crude titanium tetrachloride, introduced as a spray at the top. The spray of liquid titanium tetrachloride condenses the titanium trichloride and titanium tetrachloride gases, and these are absorbed in the sprayed liquid to form a mixture or suspension of titanium trichloride in the crude titanium tetrachloride. The temperature of the titanium tetrachloride introduced as spray into the tower should be cold in the sense that it is cool enough to effectively condense the titanium trichloride, and this may range from below room temperature to substantially above this if convenient or desirable. The proportions of gases containing titanium trichloride, and the cold liquid titanium tetrachloride introduced to the condensing chamber should be such that the titanium trichloride will amount to between 1% and 8% by weight of the crude titanium tetrachloride. This will precipitate vanadium in the crude titanium tetrachloride in amounts in which it is generally present, that is, from 0.05% to 0.6% vanadium oxytrichloride, the lower amounts within the range being employed when the vanadium content is lower as will be obvious. An excess of titanium trichloride over the range preferred above may be employed without ill effect, any unused amount being separated as an impurity in the subsequent distillation step.

Ordinarily the titanium trichloride and titanium tetrachloride reactor product gases will be completely condensed by the amount of cold crude titanium tetrachloride introduced in the condensation chamber. However, if extremely high temperatures are employed in the reactor or if a large excess of titanium tetrachloride is passed through and heated, the amount of crude titanium tetrachloride (limited by the percentage of titanium trichloride desired) may not be sufficient to condense all the titanium tetrachloride. Under these conditions the condensation step product will comprise finely divided solid titanium trichloride dispersed in partially liquid and partially vaporous titanium tetrachloride. The advantages of the invention are obtained, nevertheless, since the titanium trichloride is efficiently condensed and dispersed and the gas-solid-vapor mixture may be passed directly to the subsequent distillation step.

Distillation is employed to separate purified titanium tetrachloride from the precipitated vanadium compounds and other impurities. The operation may be carried out in suitable apparatus such as a boiler with connected distillation column for refluxing and separation of a pure titanium tetrachloride product. The distillation, which is carried out at substantially atmospheric pressure, involves heating and boiling the titanium trichloride and titanium tetrachloride mixture and this inevitably provides the elevated temperature and intimate contact and agitation to promote the reaction between titanium trichloride and impurities, particularly vanadium compounds, to precipitate these as insoluble solids. The impurities, including vanadium, are removed as solid containing sludge together with high boiling point liquid impurities, if present, from the boiler. The distilled titanium tetrachloride product is preferably condensed at a temperature sufficiently high to separate low boiling point impurities or, if desirable, an additional distillation column may be employed to separate more effectively the low boiling point impurities. Carbon tetrachloride, the principal by-product from reduction reaction, is a low boiling point impurity and will be efficiently separated during this procedure. The pure titanium tetrachloride product is suitable for production of metallic titanium pigment, or titanium compounds.

A portion of the purified titanium tetrachloride product is diverted back to the reduction step for producing titanium trichloride. It is important that the titanium tetrachloride employed to produce titanium trichloride be purified since the impurities present in crude feed material may coat the carbon reducing agent particles or apparatus and seriously reduce their reaction efficiency. It is immaterial whether the purified titanium tetrachloride to be thus cycled back is diverted as vapor or liquid. The titanium tetrachloride in the reducing reaction zone is, of course, vaporous at the temperatures required so that uncondensed titanium tetrachloride purified product may be transferred directly if desired. Liquid titanium tetrachloride product may be somewhat more readily handled and its flow rate adjusted, and it is a small matter to revaporize this in a boiler to provide vaporous titanium tetrachloride feed to the reduction reactor.

The following example will illustrate a specific embodiment of this invention:

*Example 1*

A vertical tube furnace of 1½ inches inside diameter was packed for a distance of 14 inches with lumps of coke of average diameter of ⅜ inch. Graphite electrodes were buried in the top and bottom of the coke bed and electric current passed through the bed from an external power source. The current was held at 35 amperes while the voltage was 30 volts. The temperature of the coke was quickly raised to 1300° C. Purified titanium tetrachloride vapor was introduced into the bottom of the reactor at a rate of 4.3 pounds per hour and titanium trichloride was formed when the titanium tetrachloride passed through the hot coke bed. The product gases issuing from the top of the reactor comprised about 75% titanium tetrachloride, 20% titanium trichloride and 5% carbon tetrachloride, plus incidental impurities including some carbon dust. These were passed directly from the top of the reactor through an insulated connector to a condensation chamber. Crude titanium tetrachloride of dark brown color and containing among other impurities 0.4% vanadium oxychloride ($VOCl_3$) was introduced into the top of the condensing chamber at the rate of 17 pounds per hour and at 18° C. temperature. The crude titanium tetrachloride was piped to nozzles in the top of the condensing chamber forming a spray of cold titanium tetrachloride which contacted and condensed the titanium trichloride product and most of the titanium tetrachloride from the reducing reactor. The flow of crude titanium tetrachloride and reduction product gases formed a mixture containing titanium trichloride in amount 4% of the crude titanium tetrachloride. The mixture containing crude titanium tetrachloride and titanium trichloride was passed directly into a still, employing a reflux condenser to provide efficient separation of low boiling point impurities; the high boiling components and precipitated solids, including vanadium compounds and carbon dust remaining in the still boiler, as sludge. The carbon tetrachloride by-product, produced in the reduction reaction, was separated with the low boiling impurities. The pure titanium tetrachloride distillate was water white and contained less than 0.001% vanadium oxychloride. A portion of the distillate (purified titanium tetrachloride) amounting to 4.3 pounds per hour, was diverted from the product stream and transferred back to supply titanium tetrachloride vapor for production of titanium trichloride in the reduction step.

The process of this invention is economical and efficient, and crude titanium tetrachloride may be continuously treated to produce a purified product suitable for the manufacture of titanim dioxide pigments, or titanium metal. The individual steps are well adapted to form unit operations in an integrated cyclic process with the treating agent, titanium trichloride, being produced from a diverted portion of the titanium tetrachloride product. Carbon employed as a reducing agent for production of titanium trichloride, is efficient and inexpensive, and the method described wherein electric current is employed to form a self-heating reducing agent bed, provides excellent gas contact characteristics and rapid reduction of vaporous titanium tetrachloride.

We claim:

1. A process for purifying crude titanium tetrachloride which comprises; contacting purified titanium tetrachloride with a carbonaceous reducing agent at a temperature between 850° C. and 1500° C. to produce titanium trichloride in vapor state, contacting said titanium trichloride vapor with cold liquid crude titanium tetrachloride, the titanium trichloride being present in amount from 1% to 8% by weight of the crude titanium tetrachloride, thereby to condense said titanium trichloride and to produce a mixture thereof with said crude titanium tetrachloride, distilling said mixture to produce purified titanium tetrachloride and employing a portion of said purified titanium tetrachloride to contact the said reducing agent.

2. A process for purifying crude titanium tetrachloride which comprises; contacting purified titanium tetrachloride with a carbonaceous reducing agent at a temperature above 850° C. to produce titanium trichloride in vapor state, contacting said titanium trichloride vapor with cold liquid crude titanium tetrachloride, the titanium trichloride being present in amount from 1% to 8% by weight of the crude titanium tetrachloride, thereby to condense said titanium trichloride and to produce a mixture thereof with said crude titanium tetrachloride, distilling said mixture to produce purified titanium tetrachloride and employing a portion of said purified titanium tetrachloride to contact the said reducing agent.

3. A process for purifying crude titanium tetrachloride which comprises; contacting a stoichiometric excess of purified titanium tetrachloride with a carbonaceous reducing agent at a temperature above 850° C. to produce titanium trichloride in vapor state, contacting said titanium trichloride vapor with cold liquid crude titanium tetrachloride, the titanium trichloride being present in amount from 1% to 8% by weight of the crude titanium tetrachloride, thereby to condense said titanium trichloride and to produce a mixture thereof with said crude titanium tetrachloride, distilling said mixture to produce purified titanium tetrachloride and employing a portion of said purified titanium tetrachloride to contact the said reducing agent.

4. A process for purifying crude titanium tetrachloride which comprises heating a bed of carbonaceous reducing agent to a temperature above 850° C. by passage of an electric current therethrough, contacting purified titanium tetrachloride with said heated bed of carbonaceous material to produce titanium trichloride in vapor state, contacting said titanium trichloride vapor with cold liquid crude titanium tetrachloride, the titanium trichloride being present in amount from 1% to 8% by weight of the crude titanium tetrachloride, thereby to condense said titanium trichloride and to produce a mixture thereof with said crude titanium tetrachloride, distilling said mixture to produce purified titanium tetrachloride, and employing a portion of said purified titanium tetrachloride to contact the said carbonaceous reducing agent.

5. A process for purifying crude titanium tetrachloride which comprises heating a bed of coke to a temperature above 850° C. by passage of an electric current therethrough, contacting purified titanium tetrachloride with said heated bed of carbonaceous material to produce titanium trichloride in vapor state, contacting said titanium trichloride vapor with cold liquid crude titanium tetrachloride, the titanium trichloride being present in amount from 1% to 8% by weight of the crude titanium tetrachloride, thereby to condense said titanium trichloride and to produce a mixture thereof with said crude titanium tetrachloride, distilling said mixture to produce purified titanium tetrachloride, and employing a portion of said purified titanium tetrachloride to contact the said carbonaceous reducing agent.

References Cited in the file of this patent
UNITED STATES PATENTS 2,178,685     Gage _____ Nov. 7, 1939

OTHER REFERENCES

Barksdale: "Titanium," The Ronald Press Co., New York, N.Y., 1949, page 322.